No. 626,143. Patented May 30, 1899.
E. E. CLIFT.
INSULATED JOINT FOR ELECTRIC FIXTURES.
(Application filed Feb. 8, 1899.)
(No Model.)
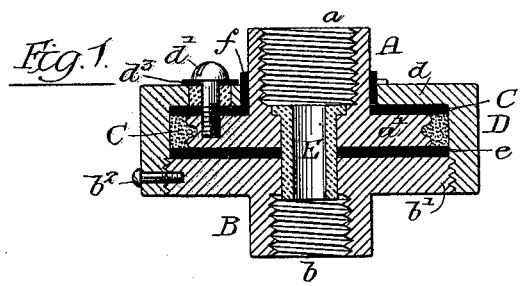
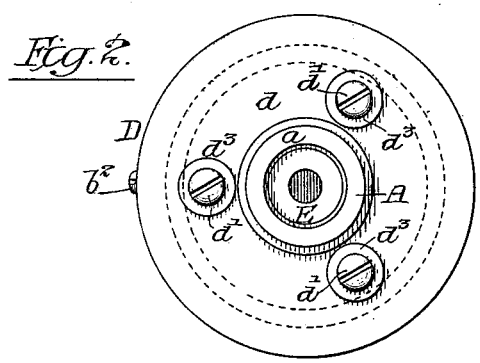
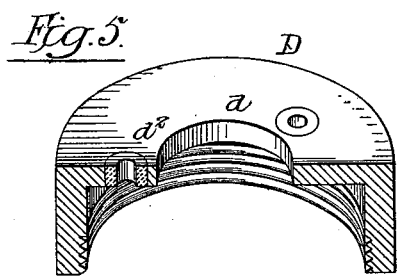
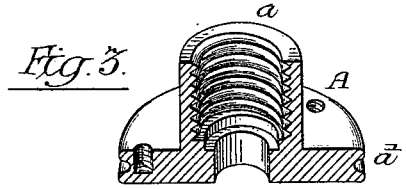
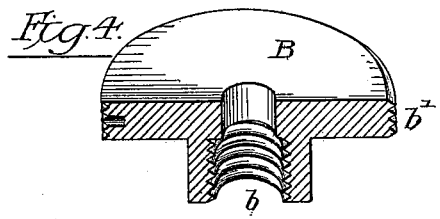

UNITED STATES PATENT OFFICE.

EDMUND E. CLIFT, OF PHILADELPHIA, PENNSYLVANIA, ASSIGNOR TO JOHN F. POLE, OF SAME PLACE.

INSULATED JOINT FOR ELECTRIC FIXTURES.

SPECIFICATION forming part of Letters Patent No. 626,143, dated May 30, 1899.

Application filed February 8, 1899. Serial No. 704,911. (No model.)

*To all whom it may concern:*

Be it known that I, EDMUND E. CLIFT, a citizen of the United States, residing in Philadelphia, Pennsylvania, have invented certain Improvements in Insulated Joints for Electric Fixtures, of which the following is a specification.

My invention relates to certain improvements in insulated joints for combined electric and gas fixtures, and especially for suspended electroliers.

The object of my invention is to provide perfect insulation between the electrolier and the supply-pipe from which it is suspended.

In the accompanying drawings, Figure 1 is a sectional view of my improved joint for electric fixtures. Fig. 2 is a plan view, and Figs. 3, 4, and 5 are detached sectional perspective views, of the elements of the fixture.

A is the upper coupling-section, having a threaded extension $a$, adapted to be screwed onto the end of an ordinary gas-supply pipe. This section A has a flange $a'$, and in this flange is a peripheral groove.

B is the lower section, having a screw-threaded extension $b$, to which can be coupled the supply-pipe of the electrolier. This section B has a flange $b'$ screw-threaded on its periphery.

D is a coupling-section having an inwardly-extending flange $d$, which overlaps the flange $a'$ of the section A and is screw-threaded, so that it can be screwed onto the flange $b'$ of the section B, as shown clearly in Fig. 1. Between the flange $d$ of the section D and the flange $a'$ of the section A is a washer $c$ of mica or other suitable non-conducting material, and between the flange $a'$ of the section A and the flange $b'$ of the section B is another mica washer $e$. It will be noticed that the flange $a'$ of the section A is not as large as the flange $b$ of the section B. Consequently there is a space between the coupling-section D and the flange. This space I fill with cement, as indicated at C. The cement I prefer to use is that ordinarily used by plumbers and which will flow on the application of heat. Thus it will be seen that the section A is completely insulated from the section B. The opening in the section D for the passage of the extension $a$ is of such size as to thoroughly insulate the parts at this point; but I preferably insert a ring $f$, of insulating material, in this space.

E is a thimble of porcelain or other non-conducting material, having a flange which rests upon a shoulder on the section A and extends through the section B, as shown in Fig. 1. The thimble preferably extends beyond the section, so that the gummy material formed in the gas-pipe will drip off the end of the thimble and will not make a short circuit.

When the coupling-section D is screwed into place, it is prevented from turning on the section B by a locking-screw $b^2$, adapted to an orifice in the section D and in the flange $b'$.

In order to confine the coupling-section D rigidly to the section A, I provide one or more screws $d'$, (three in the present instance,) which pass through non-conducting sleeves $d^2$, preferably of porcelain, and are screwed into openings in the flange $a'$ of the section A. A non-conducting washer $d^3$ is placed between the head of each screw and the coupling-section D. Thus the screw is completely insulated from the section D.

It will thus be seen that I provide a simple and readily-coupled joint for electric fixtures in which the section A is completely insulated from the section B.

In the event of the fitter twisting the joint when placing the fixture, as is often the case, the parts may become strained or loose, and by placing the cement C in the space, as indicated, I can readily heat the coupling so that the cement will flow and fill up all crevices and make a practically tight joint.

I claim as my invention—

1. The combination in a joint for electric fixtures, of two flanged sections each having an extension adapted to be coupled to a pipe, a screw-thread on the flange of one section, an internally-flanged coupling-section adapted to said threaded flange, a screw confining the coupling-section to the other flanged section, non-conducting material between the several sections, and a non-conducting thimble extending through the openings in the two flanged sections, substantially as described.

2. The combination of the section A having a screw-threaded extension and a flange, the periphery of said flange being grooved, a coupling-section having an internal flange extending over the said flange of the section A, a mica washer between the two flanges and cement between the periphery of the flange of the section A and the body of the coupling-section, a section B having a screw-threaded extension and a screw-threaded flange, said flange adapted to threads on the coupling-section, a washer of non-conducting material between the section B and the section A and a screw-bolt confining the coupling-section to the section B, substantially as described.

3. The combination in a joint for electric fixtures, of the section A having a screw-threaded extension and a flange, a coupling-section having a flange overlapping the flange of the section A, mica between the two flanges, a non-conducting sleeve in the flange of the coupling-section, a screw-bolt extending through the said sleeve and into the flange of the section A, a non-conducting washer under the head of the screw, a flanged section B screwed into the coupling-section D and having a screw-threaded extension, and a washer of non-conducting material mounted between the section A and the section B, substantially as described.

4. The combination of a flanged section A, the flanged section B, a mica washer between the two, a thimble of non-conducting material extending through a central opening in the sections A and B, a coupling-section extending over the flange of the section A and screwed onto the flange of the section B, a washer of non-conducting material between the flange of the section A and the coupling-section, and cement between the two non-conducting washers and the periphery of the flange of the section A and the coupling-section, screws extending through the coupling-section into the flange of the section A and non-conducting material between the screws and the coupling-section, substantially as described.

In testimony whereof I have signed my name to this specification in the presence of two subscribing witnesses.

EDMUND E. CLIFT.

Witnesses:
WILL. A. BARR,
JOS. H. KLEIN.